United States Patent Office 2,790,000
Patented Apr. 23, 1957

2,790,000

L-GLUTAMINE SYNTHESIS

Oscar L. Norman, Evanston, and Rose Marie Joyce, Northbrook, Ill., assignors to International Minerals & Chemical Corporation, a corporation of New York No Drawing. Application September 1, 1954,
Serial No. 453,673

11 Claims. (Cl. 260—534)

This invention relates to a method for preparing glutamine and more particularly to a process for preparing glutamine having the same optical activity as the glutamine of nature.

Known processes for the preparation of L-glutamine have been characterized by difficulties resulting from the complicated series of steps involved, the dangers of the reactants utilized, economically unfeasible manipulations, and the like. There has been a need for a simple commercially feasible process for synthesizing L-glutamine.

It is an object of the instant invention to provide an improved method for the synthesis of optically active natural glutamine, i. e., L-glutamine.

It is a further object of the instant invention to provide a method for synthesizing glutamine having the optical activity of natural glutamine without resorting to the resolution of a racemic mixture.

It is a further object of the instant invention to provide an improved synthesis of L-glutamine utilizing reactants and intermediates which are not hazardous.

These and other objects of the instant invention will be more apparent upon a fuller understanding of the invention as hereinafter described.

In accordance with this invention, L-glutamine is produced by hydrolysis of an ester of L-isoglutamine or an ester of an L-isoglutamine acid addition salt, such as, for example, L-ethyl isoglutaminate or L-ethyl isoglutaminate hydrochloride. The hydrolysis is preferably carried out in an alkaline medium utilizing an alkali such as, for example, sodium hydroxide as the hydrolyzing agent. The hydrolysis is carried out under conditions conventional for the hydrolysis of organic esters to produce organic acids.

According to a preferred embodiment of this invention, an alkyl ester of L-isoglutamine hydrochloride is dissolved in water and hydrolyzed with an alkali in the presence of a water-soluble organic solvent inert toward the hydrolysis reaction, preferably a water-soluble organic solvent having a dipole moment greater than that of water, for example, acetone, acetonitrile, and the like. In carrying out this embodiment, it is convenient to prepare a homogeneous mixture of water and the organic solvent, dissolve the L-isoglutamine ester or salt thereof in the mixture, and then add sufficient alkali to carry out the hydrolysis reaction. The reactants and solvents may be added in any convenient order, however. The reaction may be carried out at a temperature from about 0° C. to about 40° C. and preferably at about room temperature.

Acetone is particularly preferred as the water-soluble organic solvent in carrying out this embodiment of the invention. The quantity of acetone or other water-soluble organic solvent may be varied widely, but it is necessary that the quantity of water-soluble organic solvent and water be so regulated as to preclude the formation of two layers in carrying out the hydrolysis reaction. It is desirable that the quantity of water utilized be kept at a minimum to facilitate recovery of the glutamine from the reaction product mixture in high yields.

When the hydrolysis reaction is carried out utilizing water in the absence of a water-soluble organic solvent, the yields of glutamine are somewhat less than when an organic solvent is employed. Preferably the quantity of acetone or other highly polar organic solvent utilized will amount to between about 5 and about 10 times the weight of L-isoglutamine ester or salt thereof which is to be hydrolyzed. The use of more than about 20 parts of acetone per part of L-isoglutamine ester or salt thereof is undesirable as being wasteful of acetone without increasing the yields significantly.

The L-isoglutamine ester or acid addition salts thereof may be any alkyl ester, but are preferably lower alkyl esters, that is, alkyl esters in which the alkyl group contains less than about 8 carbon atoms. L-methyl isoglutaminate, L-ethyl isoglutaminate, L-propyl isoglutaminate, and L-butyl isoglutaminate are preferred in carrying out this invention, and the hydrochloride acid addition salts of these species of isoglutamine esters are particularly preferred in carrying out this reaction. The hydrobromide salts of L-isoglutamine esters may be utilized in place of the hydrochloride salts.

According to one embodiment of this invention using L-glutamic acid as a starting material, the L-glutamic acid is esterified with an alcohol, preferably a lower alcohol such as, for example, n-butanol in the presence of a catalytic amount of sulfuric acid, and azeotroping the water from the system as it is formed. The term "lower alcohol" as used herein refers to aliphatic alcohols containing less than about 8 carbon atoms. Methanol, ethanol, n-propanol, isopropanol, n-butanol, and sec.-butanol are representative alcohols of the class described. n-Butanol is particularly preferred as greatly facilitating the carrying out of this invention. The esterification reaction product is an alkyl ester of L-5-oxo-2-pyrrolidonecarboxylic acid such as, for example, n-butyl-L-5-oxo-2-pyrrolidonecarboxylate. Alternatively, n-butyl-L-5-oxo-2-pyrrolidonecarboxylate may be prepared by heating L-glutamic acid at an elevated temperature such as, for example, at about 180° C. until a bubble free liquid is obtained. This liquid is then immediately cooled to give a theoretical yield of L-5-oxo-2-pyrrolidonecarboxylic acid. The L-5-oxo-2-pyrrolidonecarboxylic acid is then esterified by treatment with an alcohol, preferably n-butanol, in the presence of a catalytic quantity of sulfuric acid. The reaction is carried out at reflux temperature and water formed during the reaction is removed azeotropically, that is by separating water from the condensed vapors on their return to the reaction vessel and permitting nonaqueous material to return to the reaction vessel. n-Butanol is preferred in the esterification reaction because it permits removal of water from the reaction mixture by azeotropic distillation. When other alcohols are used in place of n-butanol more complicated and cumbersome methods of water-removal must be employed. The treatment of the L-5-oxo-2-pyrrolidonecarboxylic acid with the alcohol produces the corresponding alkyl ester of L-5-oxo-2-pyrrolidonecarboxylate.

In producing L-glutamine in accordance with this invention utilizing an alkyl ester of L-5-oxo-2-pyrrolidone carboxylic acid as an intermediate, the alkyl ester of L-5-oxo-2-pyrrolidonecarboxylic acid is treated with anhydrous ammonia whereby a precipitate forms comprising L-5-oxo-2-pyrrolidonecarboxamide which may be removed by any convenient means such as by filtration, evaporation, etc. The filtrate will contain the alcohol used in the esterification reaction which may be recovered for reuse. Alternatively, L-5-oxo-2-pyrrolidonecarboxamide may be prepared by the ammonolysis of a dialkyl ester of L-glutamic acid, for example, L-dibutylglutamate. The ammonolysis is carried out by treating a dialkyl ester of L-glutamic acid, for example, dibutylglutamate, with a concentrated aqueous ammonia solution. The ammonolysis reaction conditions are conventional for the conversion of an organic ester to the corresponding amide.

L-5-oxo-2-pyrrolidone carboxamide prepared by any of the procedures described above is then treated with a lower alcohol such as ethanol in the presence of anhydrous hydrogen chloride or hydrogen bromide gas to produce an L-gamma alkyl isoglutaminate hydrochloride or hydrobromide as the case may be. The alcohol utilized in the reaction is preferably ethanol, but any other suitable lower monohydric alcohol may be utilized to obtain the corresponding ester of L-isoglutamine hydrochloride. Alkyl esters of L-isoglutamine and their acid addition salts may also be prepared by esterification of isoglutamine with a suitable alcohol.

The ester of L-isoglutamine hydrochloride is then dissolved in water or a homogeneous mixture of water and a water-soluble organic solvent inert in the hydrolysis reaction of this invention and having a dipole moment greater than that of water and hydrolyzed with an acid or alkali, preferably an alkali, such as sodium hydroxide or potassium hydroxide, to produce L-glutamine. In the case of the alkaline hydrolysis of an ester of L-isoglutamine or an ester of L-isoglutamine hydrochloride with an alkali such as sodium hydroxide or potassium hydroxide the reaction product will be an alkali metal salt of L-glutamine from which L-glutamine may be recovered by, for example, acidifying with a weak acid such as formic acid.

The following example illustrates a specific embodiment of this invention. All parts are by weight unless otherwise indicated.

*Example*

A reaction vessel was charged with about 140.5 parts of L-glutamic acid, about 625 parts of n-butanol, about 4 parts $H_2SO_4$ (concentrated) and refluxed for about 8 days until the L-glutamic acid was esterified. Water formed during the reaction was removed by azeotropic distillation. The reaction product was n-butyl-L-5-oxo-2-pyrrolidone carboxylate. Anhydrous ammonia in the amount of about 41 parts was then added to the reaction product mixture. A precipitate comprising L-5-oxo-2-pyrrolidonecarboxamide formed and was removed by filtration. The filtrate contained n-butanol and was set aside for reuse. The filter cake was washed with 40 parts of n-butanol and then treated with about 550 parts of anhydrous ethanol and about 38.8 parts of anhydrous hydrogen chloride gas. The reaction mixture was heated to reflux and held at reflux temperature for about 18 minutes. The reaction product mixture was filtered while still hot and the filter cake comprising ammonium chloride was discarded. The filtrate was cooled to about 3° C. with agitation and again filtered. The filtrate comprises ethanol which was suitable for reuse in the process. The filter cake which comprises L-γ-ethylisoglutaminate hydrochloride in the amount of 51 parts was agitated with an aqueous acetone mixture containing about 396 parts acetone, about 240 parts water, and 19.2 parts sodium hydroxide. The hydrolysis reaction was completed in about one hour and the reaction product mixture was agitated with about 396 parts of methanol and about 25 parts of a 90% aqueous formic acid solution. Following acidification with formic acid, the reaction product mixture was cooled to about 3° C. and maintained at this temperature for about 18 hours. The reaction product mixture was then filtered. The filter cake comprised about 97% pure L-glutamine and the filtrate contained methanol and acetone which could be recovered for reuse in the process.

Having thus fully described and illustrated the character of the invention, what is desired to be secured and claimed by Letters Patent is:

1. A process for producing L-glutamine which comprises hydrolyzing an alkyl ester of a compound of the group consisting of isoglutamine and isoglutamine acid addition salts under alkaline conditions and recovering L-glutamine from the reaction product mixture.

2. The process of claim 1 in which the reaction is carried out in a single phase mixture of water and a water-soluble organic solvent.

3. A process for producing L-glutamine which comprises hydrolyzing an alkyl ester of a compound of the group consisting of isoglutamine and isoglutamine acid addition salts under alkaline conditions, the reaction being carried out in a single phase mixture of water and a water soluble organic solvent inert to the reaction, and recovering L-glutamine from the reaction product mixture.

4. The process of claim 3 in which the alkyl ester is an alkyl ester of isoglutamine hydrochloride and the organic solvent is acetone.

5. The process of claim 4 in which the alkyl ester of isoglutamine hydrochloride is ethylisoglutaminate hydrochloride.

6. The process of claim 5 in which sodium hydroxide is used as the alkali hydrolyzing agent.

7. The process of claim 3 in which the alkyl ester is an alkyl ester of isoglutamine and the organic solvent is acetone.

8. The process of claim 7 in which the alkyl ester of isoglutamine is ethylisoglutamine.

9. The process of claim 8 in which sodium hydroxide is the alkali hydrolyzing agent.

10. A process for producing L-glutamine which comprises treating L-glutamic acid with a lower alkyl monohydric alcohol in the presence of a catalytic amount of sulfuric acid to produce an alkyl ester of L-5-oxo-2-pyrrolidonecarboxylic acid, treating the alkyl ester of L-5-oxo-2-pyrrolidonecarboxylic acid with anhydrous ammonia to produce L-5-oxo-2-pyrrolidonecarboxamide, treating the L-5-oxo-2-pyrrolidonecarboxamide with a lower alkyl monohydric alcohol in the presence of anhydrous hydrogen chloride to produce an L-alkyl isoglutaminate hydrochloride, hydrolyzing the L-alkyl isoglutaminate hydrochloride with an alkali metal hydroxide to produce the alkali metal salt of L-glutamine, treating the alkali metal salt of L-glutamine with a weak organic acid, and recovering the L-glutamine from the reaction mixture.

11. The process of claim 10 wherein the lower monohydric alcohol utilized to treat L-glutamic acid is n-butanol.

References Cited in the file of this patent

UNITED STATES PATENTS 2,524,422    Boothe et al.            Oct. 3, 1950
2,543,345    Waller et al.            Feb. 27, 1951

OTHER REFERENCES

Fuson et al.: Organic Chemistry, p. 92 (1942).
Rodd: Chem. of Carbon Compounds, vol. $I^B$, p. 1116 (1952).